US 7,401,857 B2

(12) United States Patent
Laux

(10) Patent No.: US 7,401,857 B2
(45) Date of Patent: Jul. 22, 2008

(54) LIFTABLE SEAT IN A VEHICLE

(75) Inventor: Andre Laux, Ruesslsheim (DE)

(73) Assignees: Hyundai Motor Company, Seoul (KR);
Kia Motors Corporation, Seoul (KR);
Hyundai Motor European Technical Center GmbH, Ruesslsheim (DE)

( * ) Notice: Subject to any disclaimer, the term of this patent is extended or adjusted under 35 U.S.C. 154(b) by 0 days.

(21) Appl. No.: 11/591,896

(22) Filed: Nov. 2, 2006

(65) Prior Publication Data

US 2007/0241600 A1 Oct. 18, 2007

(30) Foreign Application Priority Data

Apr. 12, 2006 (KR) .................. 10-2006-0033368

(51) Int. Cl.
*B60N 2/36* (2006.01)
(52) U.S. Cl. ................ 297/378.12; 297/188.04; 297/331; 297/334; 297/344.15
(58) Field of Classification Search ............ 297/378.12, 297/344.15, 188.04, 331, 334
See application file for complete search history.

(56) References Cited

U.S. PATENT DOCUMENTS

| 4,461,444 | A |   | 7/1984  | Grassl et al. |
|-----------|---|---|---------|---------------|
| 4,993,678 | A | * | 2/1991  | Easter ................ 297/344.15 X |
| 5,788,324 | A | * | 8/1998  | Shea et al. .......... 297/188.04 X |
| 6,059,358 | A | * | 5/2000  | Demick et al. ......... 297/188.04 |
| 6,152,533 | A | * | 11/2000 | Smuk ................ 297/378.12 X |
| 6,199,948 | B1 | * | 3/2001  | Bush et al. .......... 297/188.04 X |
| 6,220,660 | B1 | * | 4/2001  | Bedro et al. ........... 297/188.04 |
| 6,347,834 | B1 | * | 2/2002  | Couasnon ........... 297/378.12 X |
| 6,499,787 | B2 | * | 12/2002 | Jach et al. ........... 297/378.12 X |
| 6,568,736 | B2 | * | 5/2003  | Jach et al. ........... 297/378.12 X |
| 6,860,550 | B2 | * | 3/2005  | Wojcik ....................... 297/163 |
| 6,899,392 | B1 | * | 5/2005  | Saberan et al. ............... 297/334 |
| 7,077,463 | B2 | * | 7/2006  | Sun et al. ................. 297/331 X |
| 7,114,772 | B2 | * | 10/2006 | Kobayashi et al. ..... 297/188.04 |
| 7,152,921 | B2 | * | 12/2006 | Saberan ............... 297/378.12 X |
| 7,267,406 | B2 | * | 9/2007  | Sturt ..................... 297/378.12 |
| 2007/0216210 | A1 | * | 9/2007 | Kim et al. ............... 297/344.15 |
| 2007/0246985 | A1 | * | 10/2007 | Sahi ........................... 297/331 |

FOREIGN PATENT DOCUMENTS

| DE | 4426846 A1  | 12/1994 |
| JP | 2001-001805 | 1/2001  |
| JP | 2002-193002 | 7/2002  |
| JP | 2002-248980 | 9/2002  |
| KR | 96-0003643  | 2/1996  |
| KR | 96-16994    | 6/1996  |
| KR | 97-61619    | 9/1997  |

* cited by examiner

*Primary Examiner*—Rodney B. White
(74) *Attorney, Agent, or Firm*—Morgan Lewis & Bockius LLP

(57) ABSTRACT

A liftable seat in a vehicle includes: a base frame; a seat cushion frame disposed on the base frame and to which a seat cushion is coupled; a seat back frame coupled to the seat cushion frame which is foldable in a forward direction and to which a seat back is coupled; and a lifting member in which the first end is connected to the base frame and the second end of which is coupled to the seat cushion frame, and configured to lift the seat cushion frame upward from an unlifted position to a lifted position.

9 Claims, 11 Drawing Sheets

LIFTABLE SEAT IN A VEHICLE

CROSS-REFERENCE TO RELATED APPLICATION

This application claims priority to Korean Patent Application No. 10-2006-0033368 filed in the Korean Intellectual Property Office on Apr. 12, 2006, the disclosures of which are incorporated herein by reference.

BACKGROUND OF THE INVENTION (a) Field of the Invention

The present invention relates to a liftable seat in a vehicle. In particular, the liftable seat in a vehicle is typically found in the middle seat of the second row.

(b) Description of the Related Art

Generally, the back seat of the second row seat in a vehicle can be folded to a seat cushion and can slide in a longitudinal direction along the vehicle. Such a seat is generally referred to as a folding and drive seat mechanism. Since the folding and drive seat is provided in a vehicle, a wide cargo space can be obtained by folding the seat back when the seat is not occupied by a passenger.

Additionally, an unoccupied seat can be folded. However, since the height of the folded seat in the conventional folding and drive seat is similar to a seating position of a passenger, there is a drawback in that the space on the folded seat cannot be used for other purposes (i.e. putting objects on the folded seat).

Accordingly, a seat mechanism which allows the space obtained by folding the seat to be effectively used thereby providing convenience to a passenger is being sought.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a liftable seat in a vehicle which has the advantage of being lifted in a folding state so as to be used as a working place.

The present invention provides a liftable seat in a vehicle which enables the middle seat to be lifted after being folded so that a convenient space can be provided for a passenger.

An exemplary embodiment of the present invention provides a liftable seat in a vehicle which includes: a base frame; a seat cushion frame disposed on the base frame and to which a seat cushion is coupled; a seat back frame coupled to the seat cushion frame to be foldable in a forward direction and to which a seat back is coupled; and a lifting member in which a first end is connected to the base frame and the second end which is coupled to the seat cushion frame, and configured to lift the seat cushion frame upward from an unlifted position to a lifted position.

The base frame may be slidably mounted to a seat track. The base frame is located on the inner bottom surface of a vehicle. The base frame may be movable in a forward or a backward direction and supports the seat cushion frame by a manipulation of a seat drive mechanism for locking and unlocking the base frame to the seat track.

The first end of the lifting member may form a lower hinge that is rotatably connected to the base frame, and the second end of the lifting member may form an upper hinge that is connected to the seat cushion frame such that the seat cushion frame to which the upper hinge is connected is lifted from the unlifted position to the lifted position by an operation of the lifting member of being rotated with respect to the lower hinge thereby being raised in a vertical direction.

The lifting member may include at least two lifting members.

In another embodiment of the present invention, the liftable seat in the vehicle may further include a lifting member locking mechanism for fixing the lifting member to the unlifted position and to the lifted position.

The lifting member locking mechanism may include an adjustable lockable gas spring which comprises a cylinder part filled with pressurized gas and a rod part configured to be drawn out from or inserted into the cylinder. The adjustable lockable gas spring is capable of locking a position of the rod part drawn out from the cylinder part. The adjustable lockable gas spring may be disposed under the lifting member in which the first end is pivotally connected to a connecting part formed at a rear end of the lifting member that is positioned at a front side thereof, and a second end is pivotally connected to a connecting part formed at a rear end of the lifting member that is positioned at a rear side thereof. The adjustable lockable gas spring may be mounted such that the length of the rod part drawn out from the cylinder part is folded in a horizontal direction and the length portion of the rod part drawn out from the cylinder part is rotated with respect to the lower hinge so as to be raised in a vertical direction.

The lifting member locking mechanism may include: a cylinder comprising a cylinder part and a rod part configured to be drawn out from or inserted into the cylinder part and disposed under the lifting member. A first end of the cylinder is pivotally connected to a connecting part formed at a rear end of the lifting member that is positioned at a front side thereof. A second end of the cylinder is pivotally connected to a connecting part formed at a rear end of the lifting member that is positioned at a rear side thereof. The cylinder is mounted such that the length of a portion of the rod part is drawn out from the cylinder part such that the lifting member is folded in a horizontal direction and the length of a portion of the rod part is rotated with respect to the lower hinge so as to be raised in a vertical direction. A pressure supply member supplies pressure to the cylinder part so as to adjust a length of the rod part drawn out from the cylinder part. A manipulation part controls the pressure supply member so as to adjust a length of the rod part drawn out from the cylinder part, thereby moving the seat between the lifted position and the unlifted position.

In another embodiment of the present invention, the liftable seat in a vehicle may further include a seat back rear plate mounted to a rear side of the seat back frame so as to define a containing space. A working table may be installed on the containing space which is formed between the seat back frame and the seat back rear plate and is drawn out toward a side seat in a state such that the seat back frame is folded toward the seat cushion frame and is then lifted. A side of a lower end of the working table may be connected through a hinge to the seat back frame so that the working table can be drawn out toward the side seat.

In another embodiment of the invention, a hole for holding a cup may be formed on the working table which is a size sufficient to hold a cup (i.e. cup holder). The cup holder is able to hold a cup which may be provided to the seat back rear plate.

DETAILED DESCRIPTION OF THE EMBODIMENTS

An exemplary embodiment of the present invention will hereinafter he described in detail with reference to the accompanying drawings.

Figure 1:
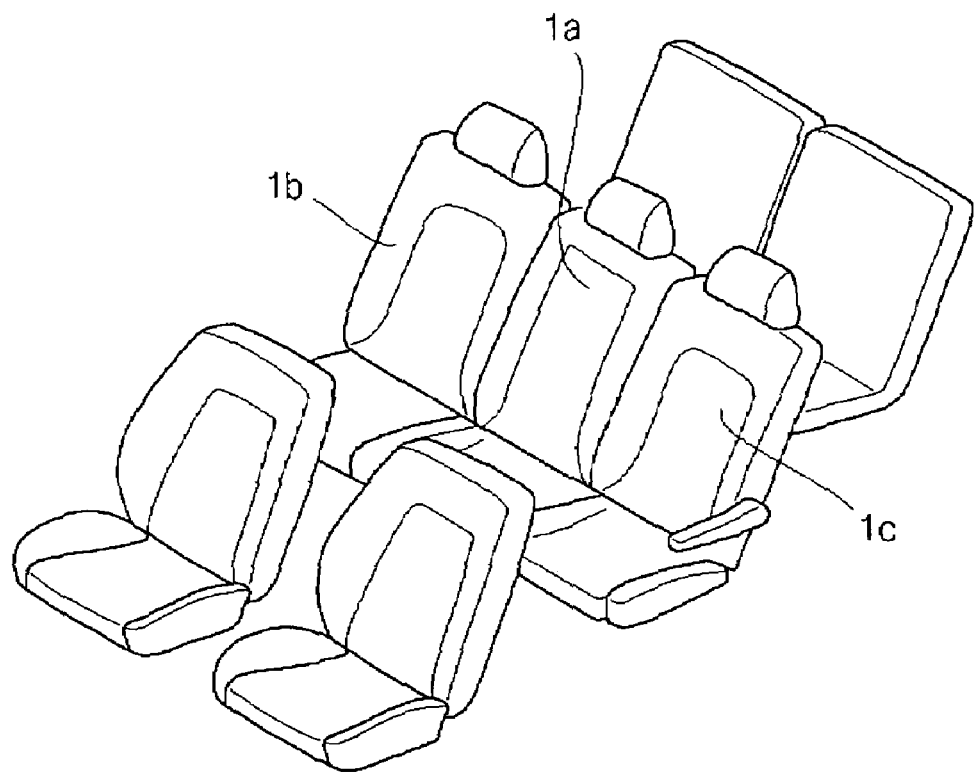
FIG. 1 is a drawing showing a seat arrangement of a vehicle.

FIG. 1 is a drawing showing a seat arrangement of a vehicle. In middle seat 1a of the seat arrangement, there is a liftable seat which serves as a convenient space to passengers occupying seats 1b and 1c, or a seat in the next row.

Figure 2:
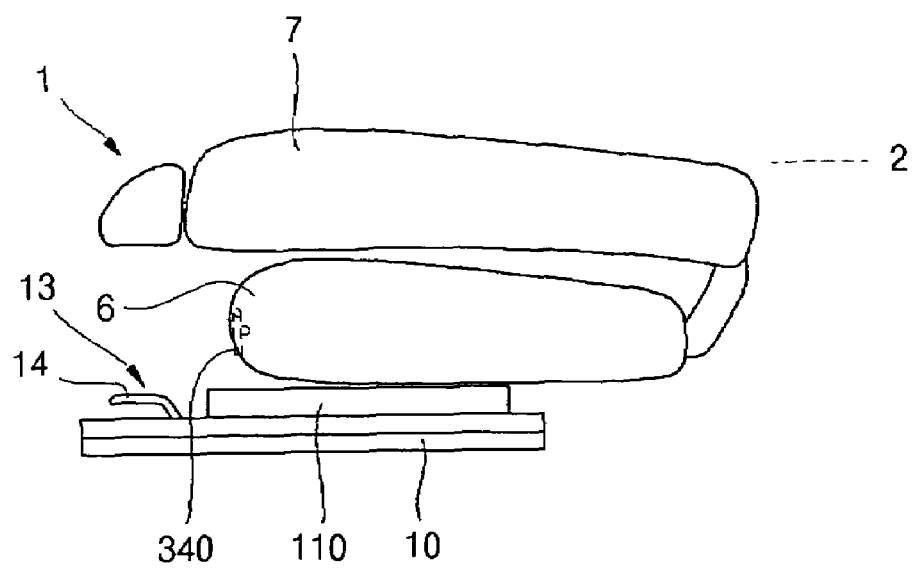
FIG. 2 is a side elevational view of a liftable seat in an unlifted position in a vehicle according to an exemplary embodiment of the present invention.
Figure 3:
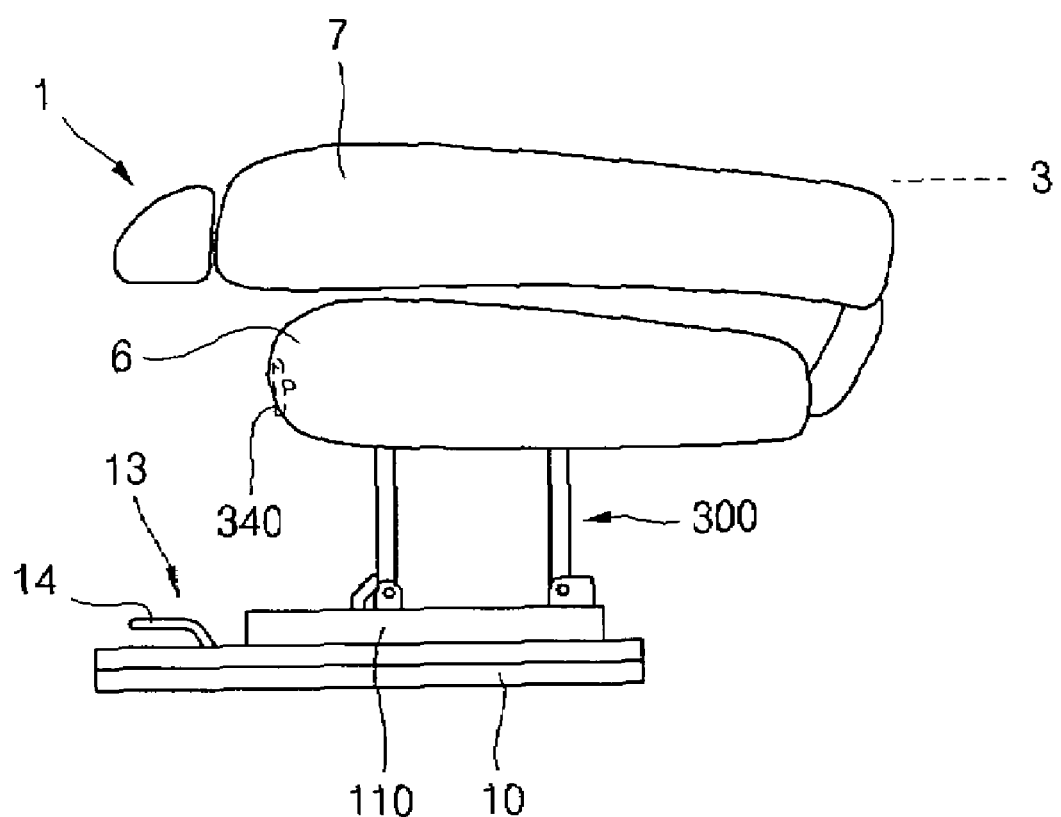
FIG. 3 is a side elevational view of a liftable seat in a lifted position in a vehicle according to an exemplary embodiment of the present invention.

FIG. 2 and FIG. 3 are drawings showing an unlifted position 2 and a lifted position 3 of a liftable seat in a vehicle according to an exemplary embodiment of the present invention. Referring to the drawings, the liftable seat is movable between the unlifted position 2 and the lifted position 3 by a lifting member 300.

If a seat 1 is lifted to the lifted position 3 such that seat back 7 is fully folded toward a seat cushion 6, a rear surface of the seat back 7 is positioned at a suitable height on which a passenger occupying the side seat puts his arm. Furthermore, the rear surface of the seat back 7 can be a working place on which a notebook computer, a laptop computer, etc. may be laid upon.

Figure 4:
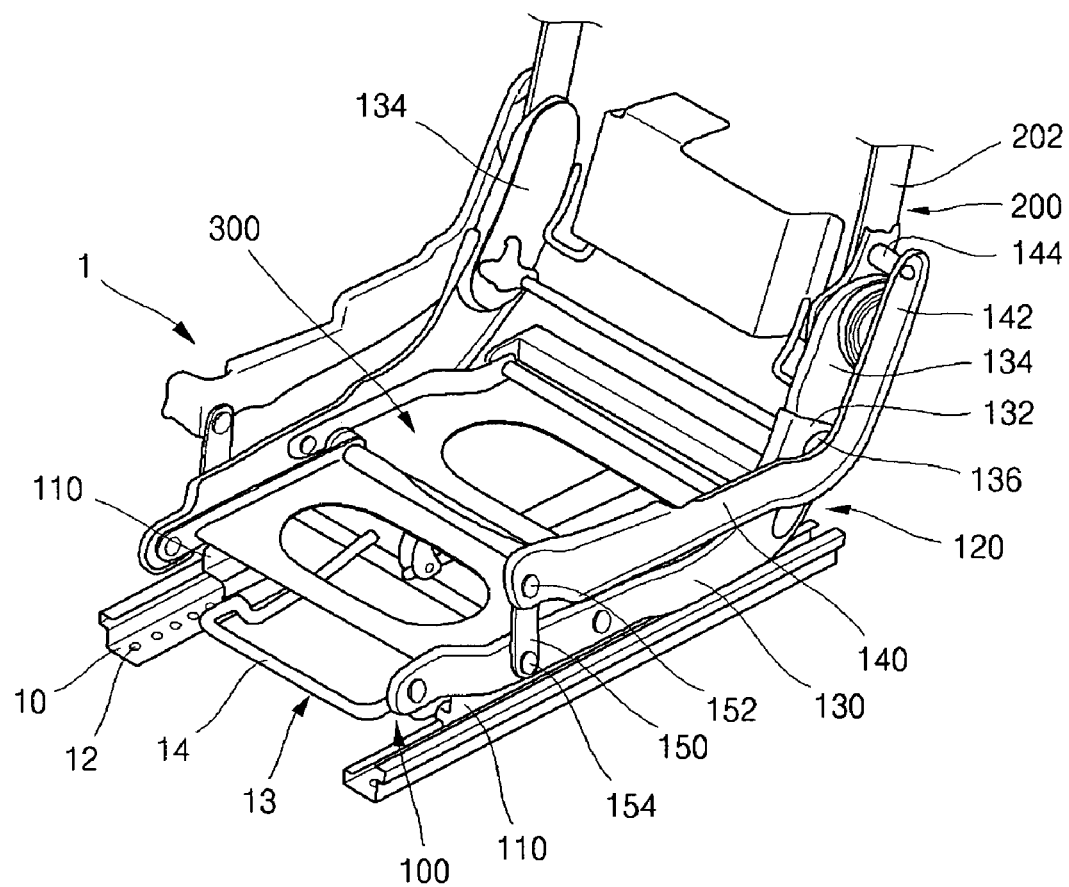
FIG. 4 is a perspective view of a liftable seat in an unfolded state in a vehicle according to an exemplary embodiment of the present invention.
Figure 5:
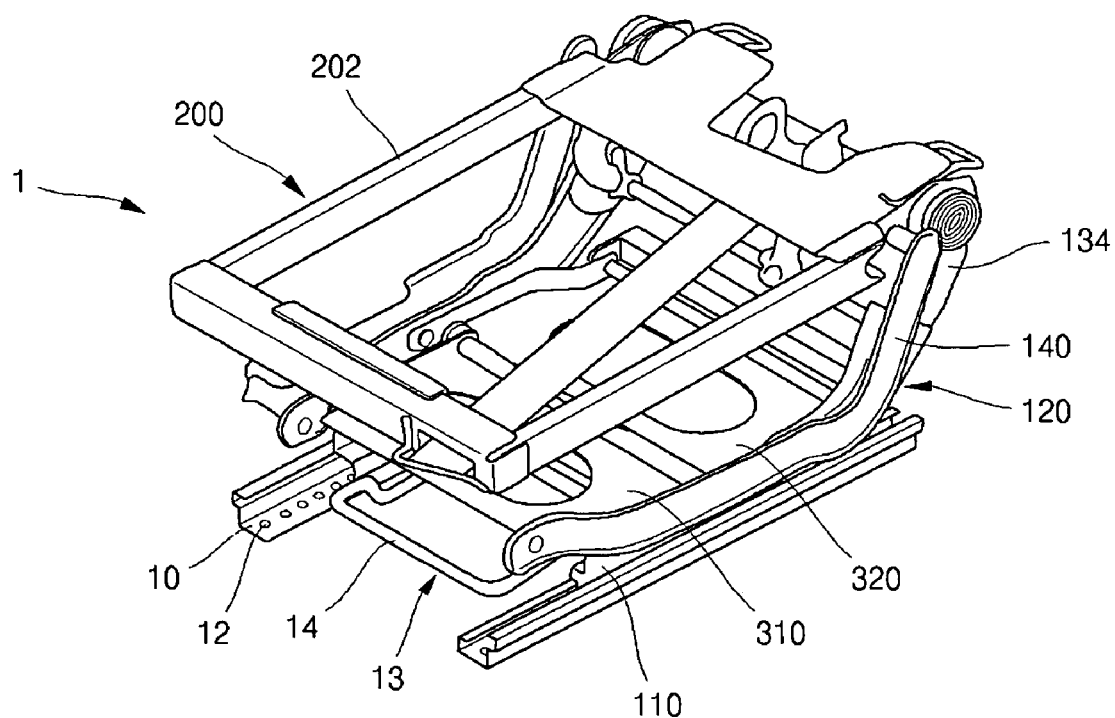
FIG. 5 is a perspective view of a liftable seat in a folded state in a vehicle according to an exemplary embodiment of the present invention.
Figure 6:
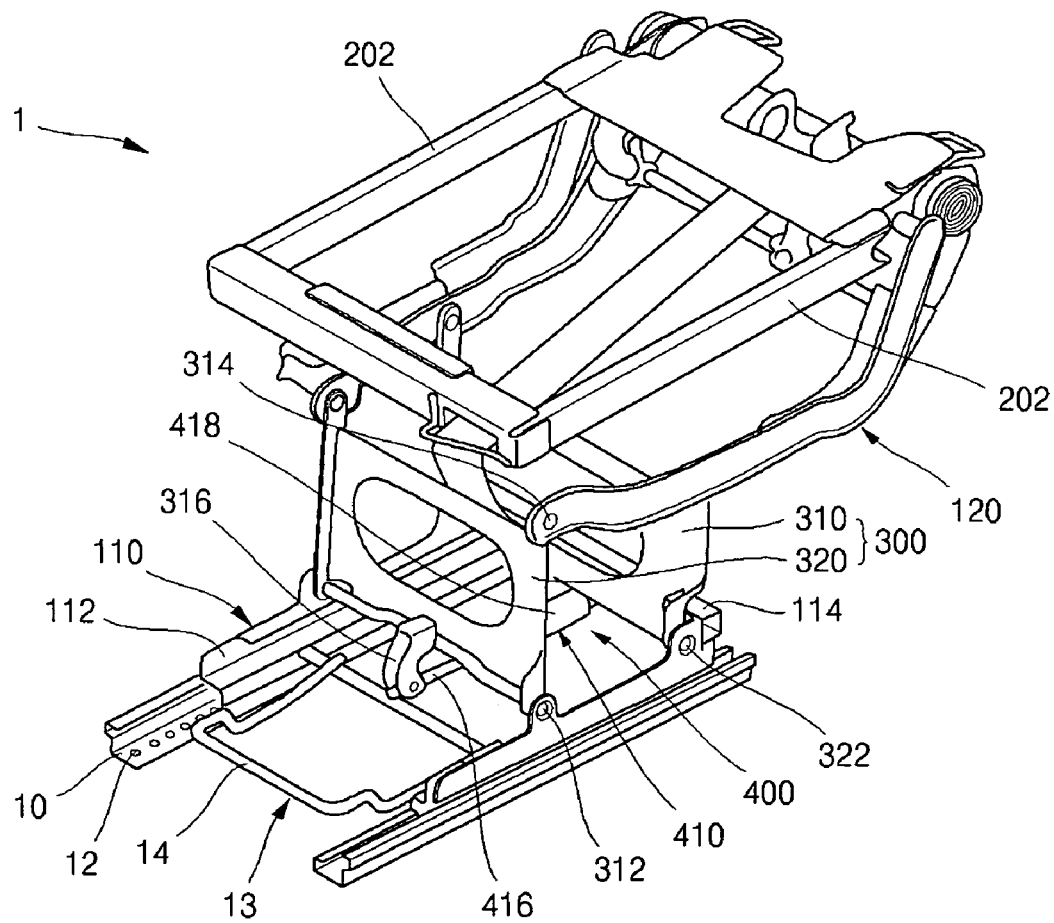
FIG. 6 is a perspective view of a liftable seat in a lifted position in a vehicle according to an exemplary embodiment of the present invention.

The structure of the liftable seat in a vehicle according to an exemplary embodiment of the present invention is shown in detail in FIG. 4 to FIG. 6. The liftable seat 1 in a vehicle includes a seat cushion assembly 100, a seat back assembly 200, and the lifting member 300.

The seat cushion assembly 106 includes a base frame 110 and a seat cushion frame 120 to which a cushion is coupled.

The base frame 110 includes a pair of base side members 112 arranged to be parallel with each other. The base rear member 114 is disposed in a direction crossing the base side member 112 and both ends of which are respectively coupled to rear ends of the base side members 112. The base side members 112 are supported by the base rear member 114 coupled thereto, thereby maintaining a shape of the base frame 110 and supporting the seat cushion frame 120 disposed thereon.

The base frame 110 is disposed on a seat track 10 in which locking grooves 12 are sequentially formed along a longitudinal direction thereof so as to be slidable along the seat track 10. Accordingly, the base frame 110 can slide in a longitudinal direction of a vehicle along the seat track 10 which is integral with the seat cushion frame 120. The seat cushion frame 120 is supported by the base frame 110 such that a position of the seat I can be adjusted.

A sliding lever 14 is disposed in a front direction of the base frame 110. The sliding lever 14 is an operating lever of a seat driving mechanism 13 that locks or unlocks the base frame 110 at a predetermined position of the seat track 10. An end portion of the sliding lever 14 extends toward the base side member 112 so as to be connected to a lock lever (not shown) coupled to the base side member 112. The lock lever is disposed between the base side member 112 and the seat track 10 so as to serve to fix the base frame 110 at a predetermined position on the seat track 10. Accordingly, if the sliding lever 14 is upwardly pulled, the lock between the base frame 110 and the seat track 10 is released, so that the base frame 110 can freely slide in a longitudinal direction of a vehicle along the seat track 10. If the sliding lever 14 is released after the position of seat 1 is adjusted, the base frame 110 is locked to the seat track 10 at the adjusted position by the lock lever.

A mechanism in which the position of a seat in a longitudinal direction is adjusted while the base frame 110 slides along the seat track 10 is widely used in a folding and drive seat mechanism. The liftable seat 1 according to an exemplary embodiment of the present invention uses a seat position regulating the seat drive mechanism which is used in the folding and drive seat mechanism in order to adjust a position of a seat in a longitudinal direction of a vehicle.

The seat cushion frame 120 includes a pair of lower side members 130 which are parallel with each other and respectively having rear parts 132 that are bent upwards, and a pair of upper side members 140 which are parallel with each other and above the lower side member 130 and respectively having rear part 142 that are bent upwards. A cushion of the seat cushion 6 is mounted to the upper side member 140.

The upper side member 140 and the lower side member 130 are connected to one another by a connecting member 150. An upper end of the connecting member 150 is rotatably connected to a frontal end portion of the upper side member 140 by an upper end hinge 152 inside the upper side member 140. A lower end of the connecting member 150 is connected through a hinge to the lower side member 130 by a lower end hinge 154 outside the lower side member 130 so as to be rotatable.

The connecting member 150 has a height at which a passenger occupying the seat cushion 6 feels at ease. The lower side member 130 is disposed to be relatively near the center of the seat cushion 6 than the upper side member 140. The connecting member 150 maintains a distance between the upper side member 140 and the lower side member 130 when the seat is unfolded. If the seat back 7 is folded toward the seat cushion 6, the upper side member 140 moves forward, thereby rotating the connecting member 150 with respect to the lower end hinge 154 and lowering the upper side member 140 such that the connecting member 150 is positioned above the base side member 112 and is parallel with the lower side member 130. At this time, the connecting member 150 is positioned between the upper side member 140 and the lower side member 130. Accordingly, when the seat back 7 is folded, the seat can be lowered. The length of the connecting member 150 relates to a height of the seat separated from a bottom surface of a passenger room of a vehicle.

The seat back assembly 200 includes a seat back frame 202.

The seat back frame 202 is connected through a hinge to a seat recliner mechanism 134 so as to be rotatable. The seat back frame 202 is mounted to the rear part 132 of the lower side member 130, such that the seat back frame 202 can be folded forward toward the seat cushion frame 120. The rear part 142 of the upper side member 140 is connected to the seat back frame 202 by a hinge axis 144 above a portion where the seat recliner mechanism 134 and the lower side member 130 are coupled to each other. Since the manipulation of a recliner release lever 136 regulates the lever of the seat recliner mechanism 134, the seat back frame 202 rotates with respect to a rotation axis of the seat recliner mechanism 134 so as to be folded toward the seat cushion frame 120. At this time, since the hinge axis 144 connecting the upper side member 140 and the seat back frame 202 are positioned above a portion where the seat recliner mechanism 134 and the lower side member 130 are connected to each other, the upper side member 140 moves forward when the seat back frame 202 is folded. The movement of the upper side member 140 causes the connecting member 150 to rotate with respect to the lower end hinge 154 so that the upper side member 140 lowers to a position laterally equal to the lower side member 130.

The first end of the lifting member 300 is coupled to the base frame 110, and the second end thereof is coupled to the seat cushion frame 120. The lifting member 300 is a member having a height called the lifting height, "LH". The lifting member 300 enables the seat cushion frame 120 to be lifted from the base frame 110 by LH. That is, the lifting member 300 lifts the seat cushion frame from the unlifted position to the lifted position.

Figure 7:
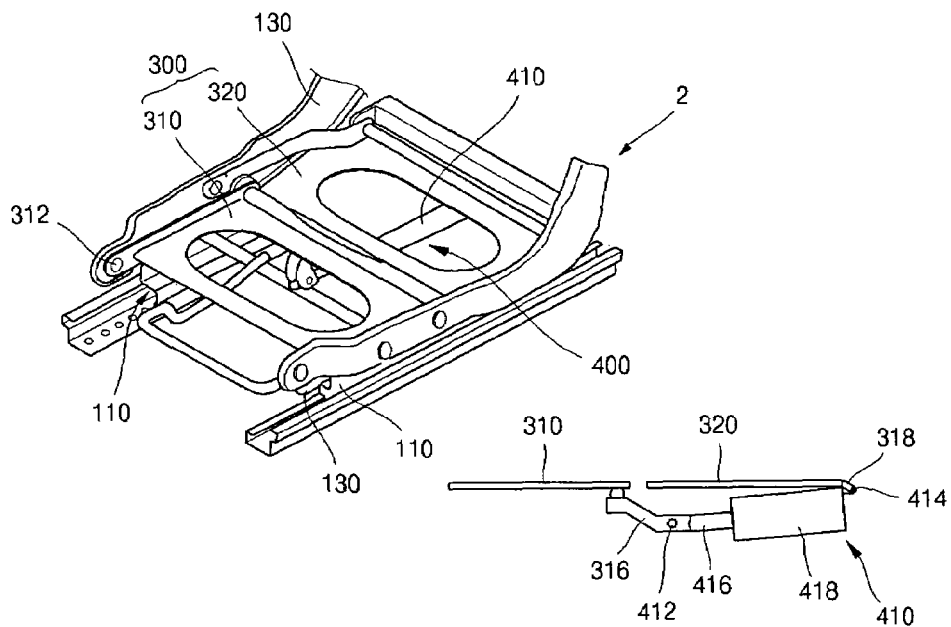
FIG. 7 is a perspective view of a liftable seat in an unlifted position in a vehicle according to an exemplary embodiment of the present invention.
Figure 8:
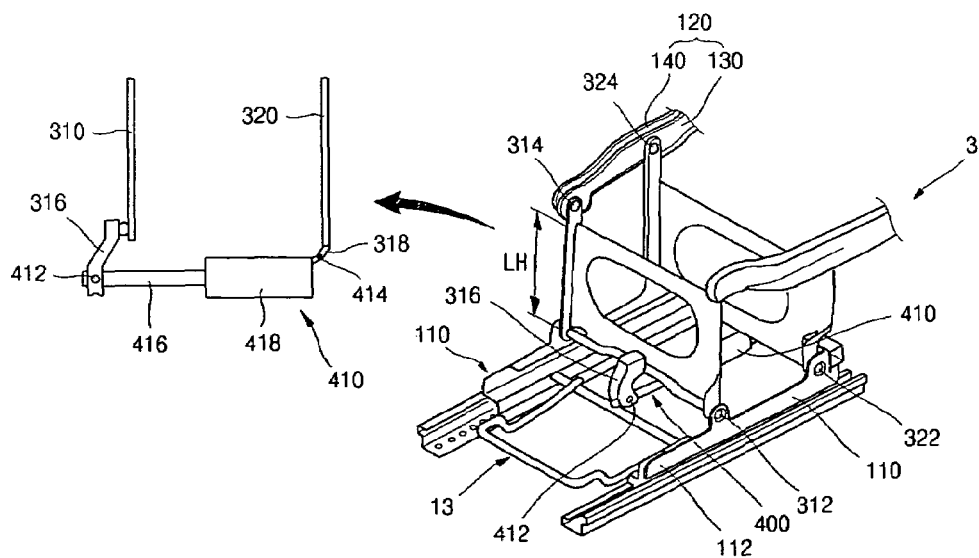
FIG. 8 is a drawing showing a lifting member in a lifted position of a liftable seat in a vehicle according to an exemplary embodiment of the present invention.

FIG. 7 is a drawing showing the lifting member 300 in the unlifted position 2 in the liftable seat in a vehicle according to an exemplary embodiment of the present invention. FIG. 8 is a drawing showing the lifting member 300 in the lifted position 3.

Referring to FIG. 7 and FIG. 8, the lifting member 300 according to an exemplary embodiment of the present invention includes a first lifting member 310 and a second lifting member 320.

The first lifting member 310 and the second lifting member 320 are respectively provided with upper hinges 314 and 324, which are respectively formed at upper ends thereof, and lower hinges 312 and 322, which are respectively formed at lower ends thereof. The upper hinges 314 and 324 and the lower hinges 312 and 322 are respectively spaced from each other by the lifting height LH.

The first lifting member 310 and the second lifting member 320 is mounted between the seat cushion frame 120 and the base frame 110 so as not to interfere with each other. The upper hinges 314 and 324 of the first and the second lifting members 310 and 320 are respectively connected through a hinge to inner side surfaces of the seat cushion frame 120 and the lower side member 130 so as to be rotatable. The lower hinges 312 and 322 are connected through a hinge to the inside of the base side member 112 of the base frame 110 so as to be rotatable. If the lifting member 300 is vertically raised from the unlifted position 2 shown in FIG. 7 to the position shown in FIG. 8, the seat cushion 6 is lifted to the lifted position 3.

A seat lifting lever 340 (shown in FIG. 2 and FIG. 3) for raising the lifting member 300 upward is mounted a lower portion of the seat cushion 6.

Referring to FIG. 7 and FIG. 8, the upper hinge 314 of the first lifting member 310 is connected through a hinge to a front portion of the lower side member 130 so as to be rotatable in a front direction. The lower hinge 312 is connected through a hinge to the base side member 112 near the center portion of the base side member 112. In addition, the upper hinge 324 of the second lifting member 320 is connected through a hinge to the lower side member 130 so as not to interfere with the first lifting member 310, and the lower hinge 322 is connected through a hinge to a rear end portion of the base side member 112. At the unlifted position 2, the first lifting member 310 and the second lifting member 320 are horizontally folded while not interfering with each other.

A lifting member locking mechanism 400 is provided to the lifting member 300. The lifting member locking mechanism 400 controls the lifting member 300 being laid down and being raised (i.e., states of the lifting member 300 in the unlifted position 2 and the lifted position 3).

The lifting member locking mechanism 400 may include a gas spring 410 installed between the first lifting member 310 and the second lifting member 320. The gas spring 410 is disposed along an imaginary center axis passing through the first lifting member 310 and the second lifting member 320. The gas spring 410 includes a first end 412 and a second end 414. A connecting part 316, to which the first end 412 of the gas spring 410 is pivotally connected via a pin or an equivalent, is provided to a lower portion of a rear end of the first lifting member 310. A connecting part 318, to which the second end 414 of the gas spring 410 is pivotally connected via a pin or an equivalent, is provided to a lower portion of a rear end of the second lifting member 320. Due to these connections, there is a distance between the two members 310 and 320, which corresponds to a length of extension of a rod part 416 of the gas spring 410 from a cylinder part 418 of the gas spring 410. Regarding the gas spring 410, it is possible to set the distance of a drawn out portion of the rod part 416 to a specific distance (i.e., to lock a piston (not shown) disposed within the cylinder part 418 to be positioned at a predetermined position). The gas spring 400 can support the lifting member 300 in both states of being horizontally folded and being raised. Such operations of the gas spring 410 are shown in detail in FIG. 7 and FIG. 8.

The gas spring 410 is disposed under the first lifting member 310 and the second lifting member 320. The gas spring 410 fixes the first lifting member 310 and the second lifting member 320 thereby maintaining the seat at the unlifted position 2, such that the first lifting member 310 and the second lifting member 320 are folded in a horizontal direction.

When the first lifting member 310 and the second lifting member 320 are raised in a vertical direction, the rod part 416 is drawn out from the cylinder part 418 by the movement of the lifting member 300. At this time, the gas spring 410 fixes the first lifting member 310 and the second lifting member 320, thereby maintaining the seat at the lifted position 3.

The gas spring used in the liftable seat in a vehicle may be a conventional adjustable lockable gas spring, and is a gas spring that can lock an adjusted position. The gas spring 410 includes the cylinder part 418 and the rod part 416 extends from the cylinder part 418. The rod part 416 is inserted into or drawn out from the cylinder part 418 by a force applied to the gas spring 410. The rod part 416 is connected to the piston (not shown) which is movably disposed within the cylinder part 418. Pressurized gas fills inner spaces of the cylinder part 418 and acts on both sides of the piston (not shown). In the adjustable lockable gas spring 410, when a force is greater than the gas flow, a force acts on the rod part 416, which allows gas to flow on both sides of the piston, thereby releasing the piston at a specific position, so that the rod part can be freely inserted into or drawn out from the cylinder part. However, if a force for inserting or drawing out the rod part 416 is cancelled, gas flow between the both sides of the piston is cut off, thereby allowing the piston to stay at the adjusted position by equilibrium of forces acting on both sides of the piston. In the case that the force applied to the rod part 416 is less than the gas flow, the gas flows on both sides of the piston thereby allowing the piston to stay at the adjusted position, i.e., the rod part 416 is fixed with respect to the cylinder part 418. Accordingly, the gas spring 410 maintains the adjusted distance between the first lifting member 310 and the second lifting member 320, thereby maintaining the unlifted state. In addition, in the case that a force is greater than the gas flow, a force is applied so as to rotate the first lifting member 310 and the second lifting member 320 to lift the seat. The force is then cancelled such that the first lifting member 310 and the second lifting member 320 are raised in a vertical direction, so that the seat is locked to the lifted position 3.

Figure 9:
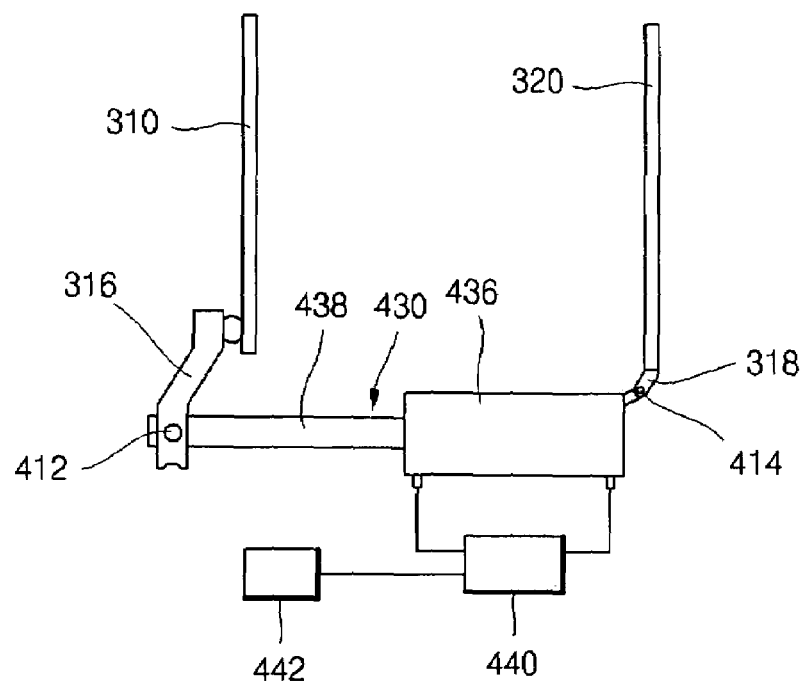
FIG. 9 is a drawing for explaining another example of a lifting member locking mechanism of a liftable seat in a vehicle according to an exemplary embodiment of the present invention.
Figure 10:
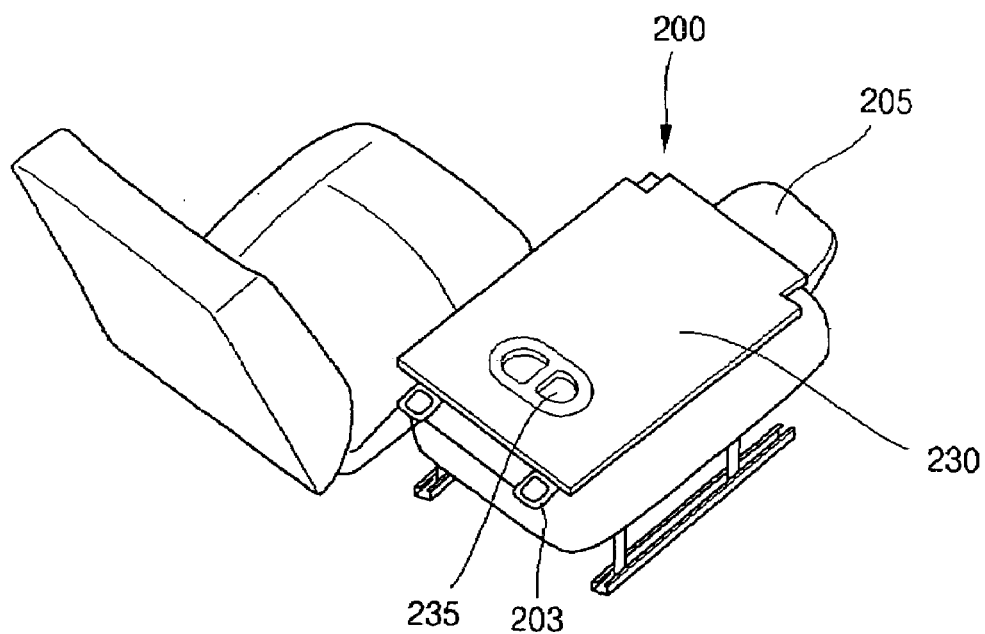
FIG. 10 is a drawing showing a seat back assembly of a liftable seat in a vehicle according to an exemplary embodiment of the present invention.

FIG. 9 shows another example of the lifting member locking mechanism 400 of a liftable seat in a vehicle. In one example of the lifting member locking mechanism 400, a cylinder 430 is installed between the first lifting member 310 and the second lifting member 320.

The cylinder 430 is disposed under the lifting member 300. The first end 412 is pivotally connected to the connecting part 316 formed at a rear end of the first lifting member 310 positioned at the front side thereof. The second end 414 is pivotally connected to the connecting part 318 formed at a rear end of the second lifting member 320 positioned at the rear side thereof. The cylinder 430 is arranged such that the length of a portion of a rod part 438 drawn out from a cylinder part 436 is folded in a horizontal direction and the length of a portion of the rod part 438 is drawn out from the cylinder part 436 in a state of the lifting member 300 and is rotated with respect to the lower hinge point so as to be raised in a vertical direction are different from each other.

The rod part 438 of the cylinder 430 includes a piston (not shown) disposed within the cylinder part 436. A pressure supply device 440 is provided in order to regulate the net force acting on the piston within the cylinder part 436 so as to adjust the movement of the rod part 438. The pressure supply device 440 operates by being electrically connected to a manipulating unit 442 regulating pressure supply so as to insert or pull out the rod part 438. Accordingly, the pressure supplied by the pressure supply device 440 can be regulated by manipulating the manipulating unit 442. (i.e. pushing buttons of the manipulating unit 442 operates the seat between the lifted position 3 and the unlifted position 2).

Mechanical devices can be used as another example of the lifting member locking mechanism 400. Examples of the mechanical devices may include a locker for locking the lifting member 300 in a horizontally folded or a vertically raised position. The lifting member of the locking mechanism 400 may use various devices capable of maintaining the adjusted states of the lifting members respectively in the unlifted position 2 and the lifted position 3.

FIG. 10 to FIG. 13 are drawings showing the structure of a seat back assembly of the liftable seat in a vehicle. According to an embodiment of the present invention, the seat back assembly 200 includes a working table 210 which can be drawn out toward a side seat positioned at left and/or right sides. A seat back rear plate 230 is mounted to a rear surface of the seat back frame 202 so as to cover the rear surface of the seat back frame 202, thereby defining a containing space for housing the working table 210.

The working table 210 is connected through a hinge to an end of the seat back frame 202 opposite to an end to which a head rest 205 is coupled, i.e., a lower end thereof, so as to be rotatable inside and outside the containing space. The working table 210 is designed not to interfere with motions of a passenger occupying the left or the right side seat in a state of being fully drawn out toward the side seat. In addition, in the case that a pair of the working tables 210 is drawn out toward the left and the right side seats, the working tables 210 are mounted at different heights such that they do not interfere with each other while being operated.

In the seat back frame 202 and the seat back rear plate 230, a containing position member 218 supports the working table 210 at a position of being contained within the containing space by being rotated toward the seat back frame 202. A drawn out position support member 220 supports the working table 210 at a position of being fully drawn out toward the left or the right seat by being rotated with respect to a hinge point 211 are provided. For these operations, a locker 212 is formed at an upper end of a side toward the hinge point 211, and a locker body 203 for supporting the locker 212 is formed on the seat back frame 202.

In addition, a cup holder hole 215 into which a cup can be downwardly inserted is formed in the working table 210 in a size of being sufficient to hold a cup.

In addition, a plurality of cup holders 235 in an indented shape for receiving a cup are formed in the seat back rear plate 230, thereby forming an upper surface of the containing space for housing the working table 210. When the seat back 7 is folded toward the seat cushion 6, a rear side of the seat back 7 can be used as a table having the functions of an arm rest and a cup holder.

Operations of a liftable seat in a vehicle according to an exemplary embodiment of the present invention will be explained hereinafter with reference to the accompanying drawings.

Figure 14:
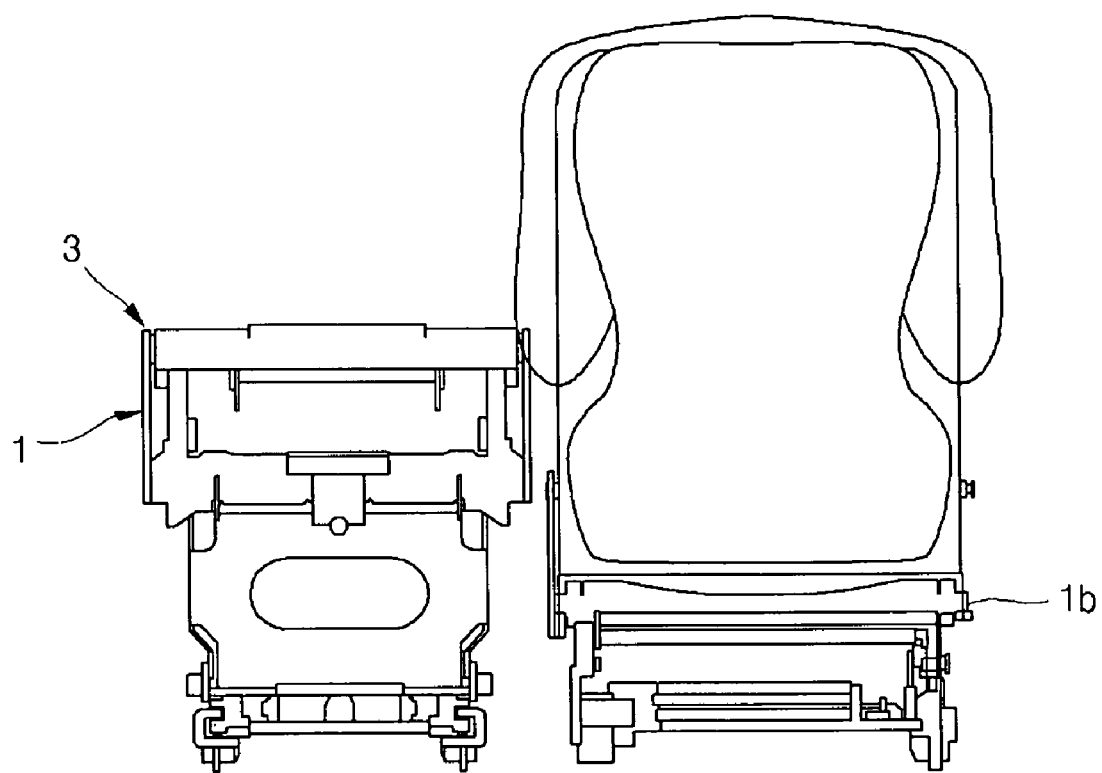
FIG. 14 is a front view of a liftable seat in a lifted position in a vehicle according to an exemplary embodiment of the present invention.

FIG. 14 is a front view of the liftable seat of vehicles according to an exemplary embodiment of the present invention in the lifted position. Referring to the drawing, in the case that the folded seat 1 is lifted to the lifted position 3, an upper surface of the seat back 7 of the seat 1 corresponds to a height of an arm rest of a passenger occupying the left or the right seat of 1a. Accordingly, a passenger on the left and the right of seat 1b can put his arm on the rear surface of the seat back 7. In addition, the lifted position of the seat 1a is a suitable position for a working place of putting a notebook computer or a laptop computer thereon.

The liftable seat can be easily used as a middle seat in a vehicle, and it can be easily lifted from the unlifted position shown in FIG. 3 to the lifted position shown in FIG. 3 by operating the lifting member 300. Furthermore, if necessary, a position of the seat in a longitudinal direction of a vehicle can be easily adjusted by manipulating the sliding lever positioned at a frontal lower portion of the seat.

Figure 11:
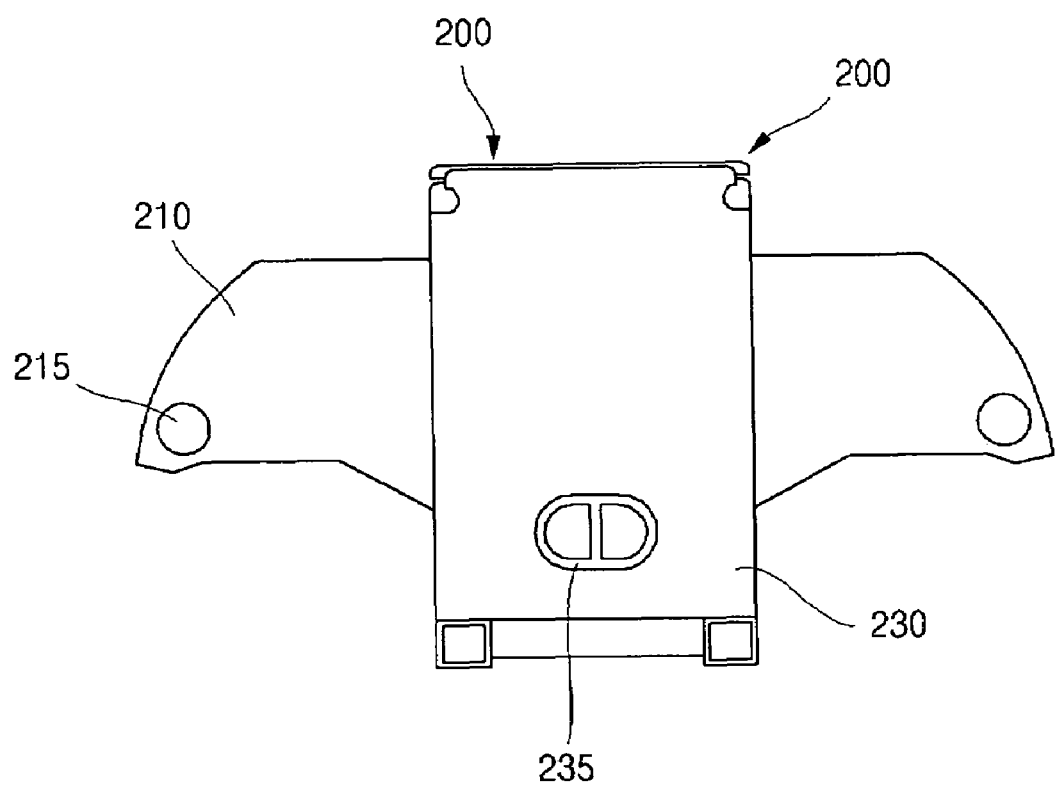
FIG. 11 is a top plain view of a seat back assembly of a liftable seat in a vehicle according to an exemplary embodiment of the present invention.
Figure 12:
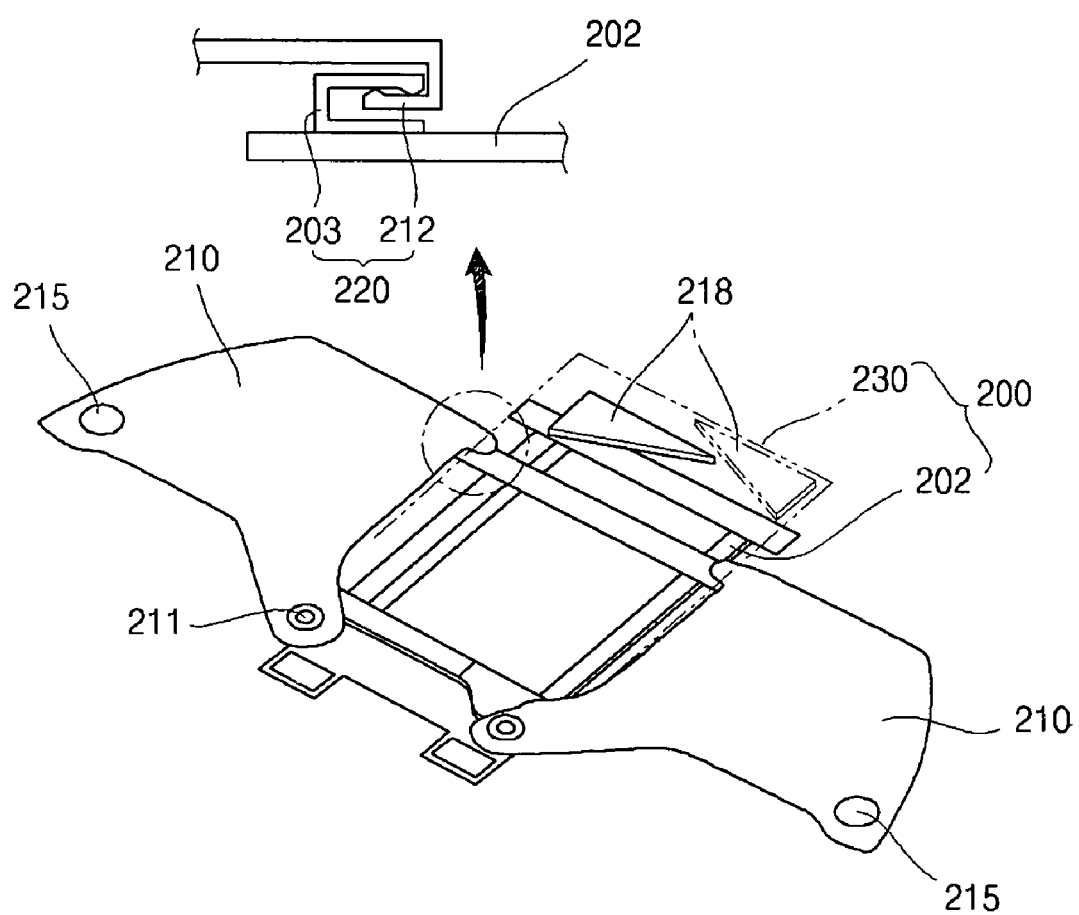
FIG. 12 is a drawing showing an installed state of a working table of a seat back assembly of a liftable seat in a vehicle according to an exemplary embodiment of the present invention.
Figure 13:
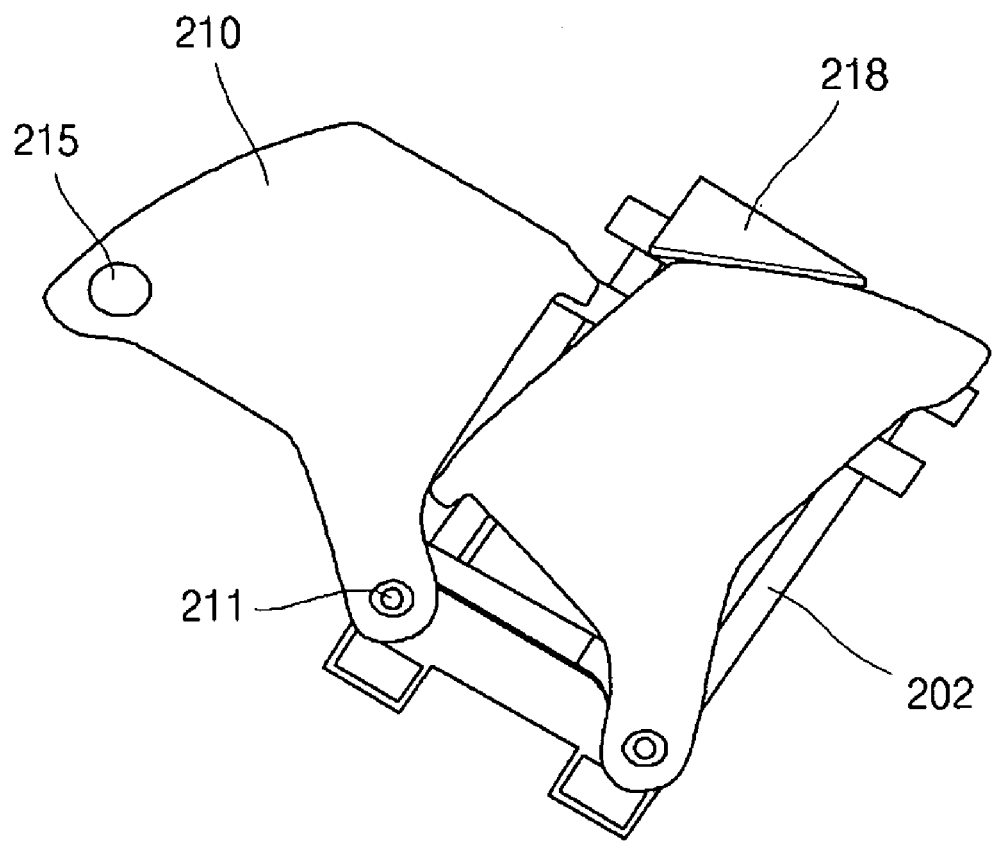
FIG. 13 is a drawing showing a housed state of a working table of a seat back assembly of a liftable seat in a vehicle according to an exemplary embodiment of the present invention.

In addition, a passenger can draw out the working table from the seat back assembly as shown in FIG. 11 so as to use the working table as a working place. The cup holder which is provided to the working table and the cup holder which is provided to the seat back rear plate can provide much convenience to passengers in using the liftable seat as a working place.

The liftable seat according to an embodiment of the present invention can be folded and then be lifted to a height at which a passenger uses the seat as an arm rest or a working place. The lifted seat can be used as a working place on which a passenger puts a laptop computer or a notebook computer.

Furthermore, the working table provided to the seat back assembly can be used as a place on which a passenger occupying a left or a right side seat may lay a computer on the working table, and the cup holder for holding a cup can also be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liftable seat in a vehicle, comprising:
   a base frame;
   a seat cushion frame disposed above the base frame and to which a seat cushion is coupled;
   a seat back frame coupled to the seat cushion frame, configured to be foldable toward the seat cushion frame in a forward direction, and to which a seat back is coupled;
   at least one lifting member having a lower end portion and an upper end portion, wherein the lower end portion is connected to the base frame and the upper end portion is coupled to the seat cushion frame, the lifting member being configured to lift the seat cushion frame upward from an unlifted position to a lifted position; and
   a lifting member locking mechanism which fixes the lifting member to the unlifted position or the lifted position,
   wherein the lifting member locking mechanism comprises:
   an adjustable lockable gas spring which includes i) a cylinder part filled with pressurized gas and ii) a rod part configured to be drawn out from or inserted into the cylinder part, in which the adjustable lockable gas spring is capable of locking a position of the rod part drawn out from the cylinder part, and is disposed under the lifting member, wherein a first end of the gas spring is pivotally connected to a first connecting part formed at a first lower end portion of the lifting member that is positioned at a front side of the first end of the gas spring, and a second end of the gas spring is pivotally connected to a second connecting part formed at a second lower end portion of the lifting member that is positioned at a rear side of the second end of the gas spring.

2. A liftable seat in a vehicle, comprising:
   a base frame;
   a seat cushion frame disposed above the base frame and to which a seat cushion is coupled;
   a seat back frame coupled to the seat cushion frame, configured to be foldable toward the seat cushion frame in a forward direction, and to which a seat back is coupled;
   at least one lifting member having a lower end portion and an upper end portion, wherein the lower end portion is connected to the base frame and the upper end portion is coupled to the seat cushion frame, the lifting member being configured to lift the seat cushion frame upward from an unlifted position to the lifted position;
   a lifting member locking mechanism which fixes the lifting member to the unlifted position or to a lifted position,
   wherein the lower end portion of the lifting member forms a lower hinge that is rotatably connected to the base frame, and the upper end portion of the lifting member forms an upper hinge that is connected to the seat cushion frame, so that the seat cushion frame to which the upper hinge is connected is lifted from the unlifted position to the lifted position;
   wherein the lifting member locking mechanism comprises:
   an adjustable lockable gas spring which includes i) a cylinder part filled with pressurized gas and ii) a rod part configured to be drawn out from or inserted into the cylinder part, in which the adjustable lockable gas spring is capable of locking a position of the rod part drawn out from the cylinder part, and is disposed under the lifting member, wherein a first end of the gas spring is pivotally connected to a first connecting part formed at a first lower end portion of the lifting member that is positioned at a front side of the first end of the gas spring and a second end of the gas spring is pivotally connected to a second connecting part formed at a second lower end portion of the lifting member that is positioned at a rear side of the second end of the gas spring.

3. A liftable seat in a vehicle, comprising:
   a base frame;
   a seat cushion frame disposed above the base frame and to which a seat cushion is coupled;
   a seat back frame coupled to the seat cushion frame, configured to be foldable toward the seat cushion frame in a forward direction, and to which a seat back is coupled;
   a least one lifting member having a lower end portion and an upper end portion, wherein the lower end portion is connected to the base frame and the upper end portion is coupled to the seat cushion frame, the lifting member being configured to lift the seat cushion frame upward from an unlifted position to a lifted position;
   a lifting member locking mechanism which fixes the lifting member to the unlifted position or the lifted position,
   wherein the lower end portion of the lifting member forms a lower hinge that is rotatably connected to the base frame, and the upper end portion of the lifting member forms an upper hinge that is connected to the seat cushion frame, so that the seat cushion frame to which the upper hinge is connected is lifted from the unlifted position to the lifted position, wherein the lifting member locking mechanism comprises:
   a) a cylinder which includes a cylinder part and a rod part configured to be drawn out from or inserted into the cylinder part, wherein the cylinder is disposed under the lifting member, the cylinder further comprising i) a first end of the cylinder pivotally connected to a first connecting part formed at a first lower end portion of the lifting member that is positioned at a front side of the first end of the cylinder, and ii) a second end of the cylinder pivotally connected to a second connecting part formed at a second lower end portion of the lifting member that is positioned at a rear side of the second end of the cylinder, with the cylinder being mounted such that a length of a portion of the rod part drawn out from the cylinder part when the lifting member is folded in a horizontal direction and a length of a portion of the rod part drawn out from the cylinder part when the lifting member is rotated with respect to the lower hinge so as to be raised in a vertical direction are different from each other;

b) a pressure supply member which supplies pressure to the cylinder part so as to adjust a length of the rod part drawn out from the cylinder part; and c) a manipulation part which controls the pressure supply member so as to adjust a length of the rod part drawn out from the cylinder part, thereby moving the seat between the lifted position and the unlifted position.

4. The liftable seat of any of claims 1, 2, or 3, further comprising:

a) a seat back rear plate mounted to a rear side of the seat back frame so as to define a containing space between the seat back frame and the seat back rear plate; and b) a working table installed within the containing space and being able to be drawn out toward a side seat when the seat back frame is folded toward the seat cushion frame and then lifted with the seat cushion frame to the lifted position.

5. The liftable seat of any of claims 1, 2 or 3, wherein the base frame is slidably mounted to a seat track which is provided to an inner bottom surface of the vehicle, so that the base frame is movable in the forward or a backward direction, with the seat cushion frame being supported by the base frame, by manipulating a seat drive mechanism for locking and unlocking the base frame to the seat track.

6. The liftable seat of any of claims 1, 2 or 3, wherein the at least one lifting member comprises at least two lifting members.

7. The liftable seat of claim 4, wherein a side of a lower end of the working table is connected through a hinge to the seat back frame such that the working table can be drawn out toward the side seat.

8. The liftable seat of claim 7, wherein a hole for holding a cup is formed on the working table such that the hole is of a sufficient size to be holding a cup.

9. The liftable seat of claim 4, wherein a cup holder is provided on the seat back rear plate.

* * * * *